United States Patent
Wagner

(10) Patent No.: US 9,839,857 B2
(45) Date of Patent: Dec. 12, 2017

(54) METHOD FOR OPERATING A DEVICE, IN PARTICULAR AN AMUSEMENT RIDE, TRANSPORT MEANS, A FITNESS APPARATUS OR THE LIKE

(71) Applicant: VR COASTER GMBH & CO. KG, Kaiserslautern (DE)

(72) Inventor: Thomas Wagner, Hochspeyer (DE)

(73) Assignee: VR COASTER GMBH & CO. KG, Kaiserslautern (DE)

( * ) Notice: Subject to any disclaimer, the term of this patent is extended or adjusted under 35 U.S.C. 154(b) by 0 days.

(21) Appl. No.: 15/116,335

(22) PCT Filed: Aug. 6, 2015

(86) PCT No.: PCT/EP2015/068205
§ 371 (c)(1),
(2) Date: Aug. 3, 2016

(87) PCT Pub. No.: WO2016/023817
PCT Pub. Date: Feb. 18, 2016

(65) Prior Publication Data
US 2016/0346704 A1  Dec. 1, 2016

(30) Foreign Application Priority Data

Aug. 11, 2014  (DE) .................. 10 2014 111 386
Jan. 22, 2015  (DE) .................. 10 2015 100 943

(51) Int. Cl.
*A63G 31/16*  (2006.01)
*A63G 7/00*  (2006.01)
(Continued)

(52) U.S. Cl.
CPC .............. *A63G 31/16* (2013.01); *A63G 7/00* (2013.01); *G06F 3/012* (2013.01); *G06T 19/006* (2013.01)

(58) Field of Classification Search
CPC ....... A63G 31/00; A63G 312/16; A63F 13/00; A63F 13/12; G09B 9/00; G09B 9/05
(Continued)

(56) References Cited

U.S. PATENT DOCUMENTS 5,584,697 A * 12/1996 Trumbull ............... A63G 31/16
434/29
5,662,523 A * 9/1997 Yasumaru ............... A63F 13/12
273/DIG. 17
(Continued)

FOREIGN PATENT DOCUMENTS

CN  200983877 Y  12/2007
EP  2138213 A1  12/2009
(Continued)

OTHER PUBLICATIONS

German Office Action dated Jul. 16, 2015 corresponding to application No. 10 2015 100 943.9.
(Continued)

*Primary Examiner* — Kien Nguyen
(74) *Attorney, Agent, or Firm* — Nath, Goldberg & Meyer; Jerald L. Meyer; Stanley N. Protigal

(57) ABSTRACT

A method for operating an amusement ride includes at least one vehicle which moves along a route and accommodates at least one passenger. By means of an amusement-ride-specific computer program, a virtual reality corresponding to a journey of the vehicle is generated and is represented on a head-mounted display associated with the passenger of a vehicle in accordance with the position of the vehicle on the route, and in accordance with the position and/or the orientation of the head-mounted display. The amusement-ride-specific computer program is executed on a mobile terminal of the passenger which comprises a communication interface. Alternatively, the amusement-ride-specific computer program is executed on an apparatus which is firmly con- (Continued)

Figure 1:
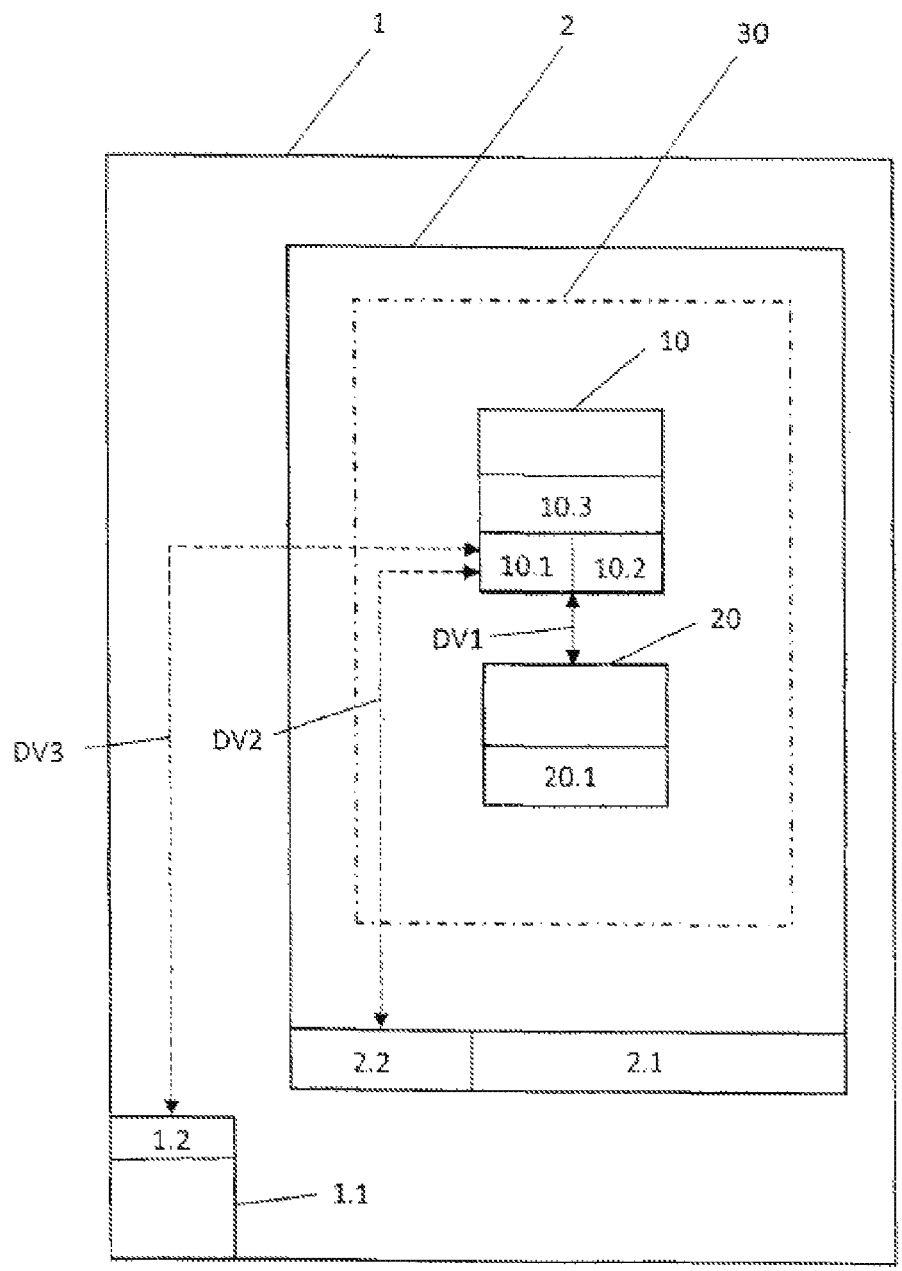

nected to the vehicle and is designed to connect with the head-mounted display of the passenger. Further, an amusement ride, in particular to a roller coaster, carries out the method above.

15 Claims, 2 Drawing Sheets

(51) Int. Cl.
   *G06F 3/01* (2006.01)
   *G06T 19/00* (2011.01)
   *A63F 13/00* (2014.01)
(58) Field of Classification Search
   USPC ...... 472/43, 59–61, 130; 434/29, 55, 62, 69, 434/307 R, 365, 60, 66; 104/53, 55, 76, 104/85
   See application file for complete search history.

(56) References Cited

U.S. PATENT DOCUMENTS

| | | | |
|---|---|---|---|
| 5,716,281 A * | 2/1998 | Dote | F41J 9/14 463/2 |
| 6,079,982 A | 6/2000 | Meader | |
| 6,179,619 B1 | 1/2001 | Tanaka | |
| 2010/0079356 A1 | 4/2010 | Hoellwarth | |
| 2010/0240454 A1† | 9/2010 | Xiao | |
| 2013/0032053 A1 | 2/2013 | Stoker | |

FOREIGN PATENT DOCUMENTS

| | | |
|---|---|---|
| JP | 2001062154 A | 3/2001 |
| WO | 9527543 A1 † | 10/1995 |
| WO | 9831444 A1 † | 7/1998 |

OTHER PUBLICATIONS

Petzold, Bernd; "Ethziente Mikromontage in kleinen Stuckzahlen durch Teleprasenz"; Iwb newsletter; Feb. 2012. Munchen; Herbert Utz Verlag; Jun. 2004 (Feb. 2012); 1-2; ISBN ISSN 1434-234 X.
"The Rift & Out of Home Entertainment", 33 pages, internet publication at https://forums.oculus.com/community/discussion/3291/oculus-rift-attraction-at-six-flags-parks, Aug. 2013, and http://www.mtbs3d.com/phpbb/viewtopic.php?f=140&t=18393, Aug. 5, 2013.†
Tom Rudderham, "HELIX Rollercoaster", 7 pages, internet publication at http://www.theriftarcade.com/helix-rollercoaster/, May 6, 2014, and https://www.youtube.com/watch?v=MSLj4vJgfDI 9, May 4, 2014.†
Ben Lang, "How Two Indie Devs Snuck a Concealed Oculus Rift and Laptop onto a Roller Coaster for the Ride of a Lifetime", 14 pages, internet publication at http://www.roadtovr.com/two-indie-devs-snuck-concealed-oculus-rift-laptop-onto-rollercoaster-ride-lifetime/, May 9, 2014.†
Hugh Langley, "Oculus Rift on a roller coaster is as crazy as it sounds", 15 pages, internet publication at http://www.in.techradar.com/news/gaming/Oculus-Rift-on-a-roller-coaster-is-as-crazy-as-it-sounds/articleshow/38484943.cms, May 12, 2014.†
Jonathan Forder, "Oculus Rollercoaster", 11 pages, internet publication at https://www.youtube.com/watch?v=d-AyS3Laazo&lc=z12lexug2suderwap04cfzhhsqupwj2aiis, Apr. 17, 2014.†
Patricia Hernandez, "They Took an Oculus Rift on a Real Roller Coaster for Some Reason", 11 pages, internet publication at http://kotaku.com/they-took-an-oculus-rift-on-a-real-roller-coaster-for-s-1574145196, May 9, 2014.†

\* cited by examiner
† cited by third party

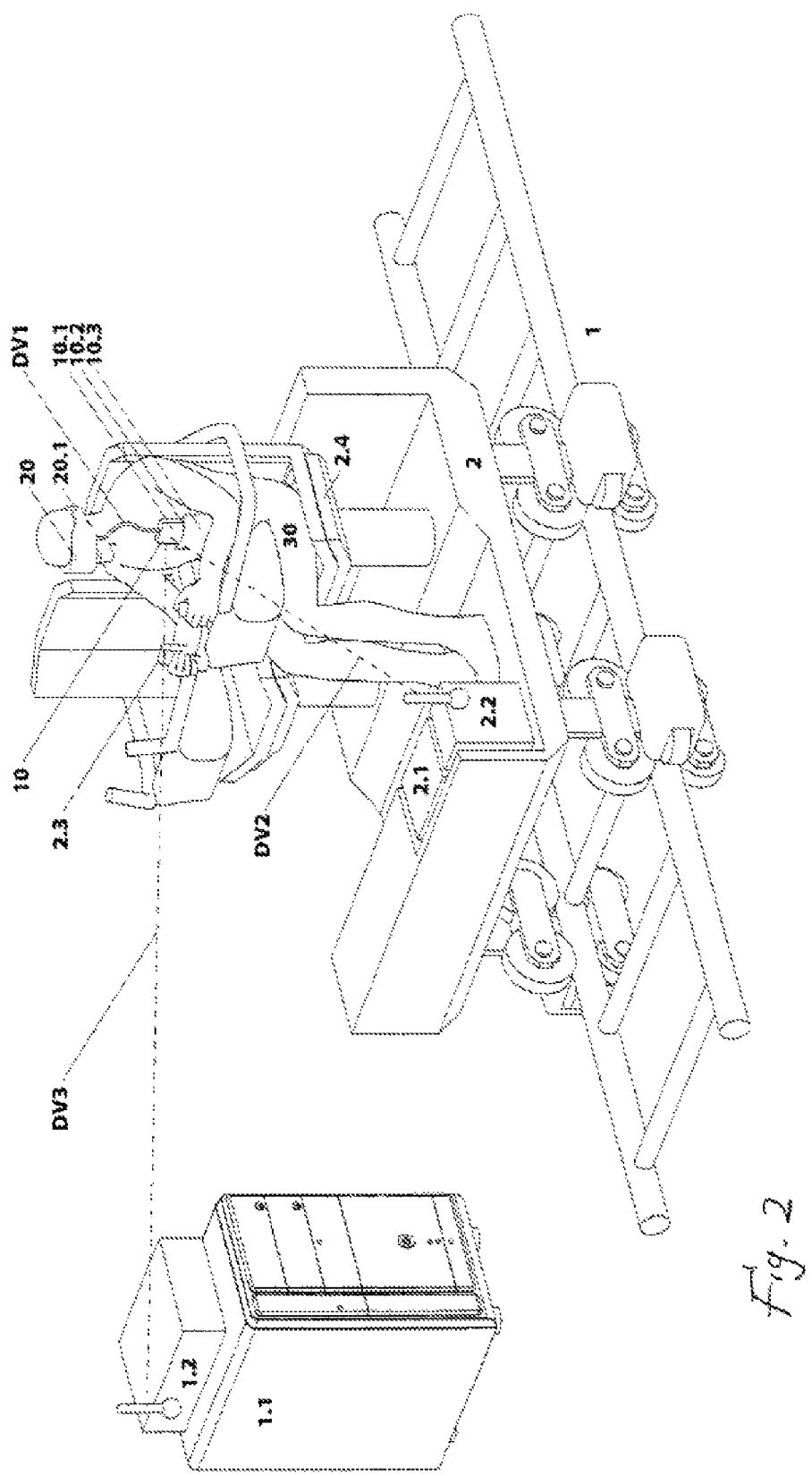

METHOD FOR OPERATING A DEVICE, IN PARTICULAR AN AMUSEMENT RIDE, TRANSPORT MEANS, A FITNESS APPARATUS OR THE LIKE

This is a National Phase Application filed under 35 U.S.C. 371 as a national stage of PCT/EP 2015/068205, filed Aug. 6, 2015, an application claiming the benefit of German Application No. 102014111386.1, filed Aug. 11, 2014, and German Application No. 102015100943.9, filed Jan. 22, 2015, the content of each of which is hereby incorporated by reference in its entirety.

The invention relates to a method for operating device, in particular an amusement ride, in particular a roller coaster, with at least one vehicle which moves along a route and accommodates at least one passenger according to the preamble of claim 1. Furthermore, the invention relates to an amusement ride, in particular a roller coaster, for carrying out the method according to the invention. The invention also relates to operating transport means such as cars, trains or planes or else fitness apparatuses.

A method according to the preamble is also known from EP 2 138 213 B1, in which a virtual reality of a journey with a roller coaster is represented on glasses or a head-mounted display to be worn by a passenger. The image of the visual reality in the current field of vision of the passenger is replaced by means of the head-mounted display by the stereoscopic representation of a virtual reality. Here, the representation of the virtual reality is adapted in real time synchronously with the head movement, in accordance with the position and/or orientation of the head-mounted display. The visual reality can also be recorded by a camera and enhanced in the representation of the head-mounted display by the importing of augmented reality effects. Furthermore, in this known method, the amusement ride comprises a position sensor for determining the position of the vehicle along the route, so that the virtual reality can be generated and represented with the head-mounted display in accordance with the position of the vehicle along the route.

JP 2001 062 154 A describes a helmet with glasses and headphones in the form of a head-mounted display for the representation of image and audio information, which is to be worn by a passenger of a roller coaster during the journey. In these glasses, a virtual reality is overlain and the associated audio information is generated via the headphones. For this purpose, different image and audio information can be selected by the passenger.

In these known amusement rides, in which the passenger wears a head-mounted display during the journey and on which a virtual reality, which is synchronized with the journey, of the journey or of the roller coaster journey is displayed for the passenger, the head-mounted display always has to be connected to a data processing system integrated in the amusement ride. Here, when such head-mounted displays are used, a data processing system is required for each seat due to the individual viewing directions of the passengers of an amusement ride.

On the one hand, such data processing systems can be firmly mounted in a vehicle of the amusement ride, as a result of which they are, however, permanently exposed to considerable vibration. On the other hand, a data processing system could also be accommodated centrally in a computation center apart from the amusement ride, resulting in an expensive transmission of the position and direction data of the head-mounted display to the computation center as well as a retransmission of the stereoscopic representation generated on the basis of these passenger-specific data to the head-mounted displays. This would lead to a high technical expenditure and, in particular, it could generate a problematic latency in the immersive experience of the passenger, which could induce vertigo and nausea in the passenger.

Moreover, in these known amusement rides, in addition to the above-mentioned data processing systems, a firmly installed head-mounted display is always required for each seat.

In addition, these head-mounted displays are to be worn day in day out by thousands of passengers, which represents a considerable challenge in view of the hygienic operation of the head-mounted display as well as the maintenance and repair thereof.

The invention is based on the object of developing the above-mentioned method in such a manner that the amusement ride can be operated inexpensively.

This object is attained by a method having the features of claim 1 and the features of claim 4.

This method for operating an amusement ride, in particular a roller coaster, with at least one vehicle which moves along a route and accommodates at least one passenger, wherein, by means of an amusement-ride-specific computer program, a virtual reality corresponding to a journey with the vehicle is generated and represented on a head-mounted display associated with the passenger of a vehicle, in accordance with the position of the vehicle on the route as well as in accordance with the position and/or the orientation of the head-mounted display, is characterized according to the first-mentioned means of attaining the object of the invention according to the invention in that the amusement-ride-specific computer program is executed on a mobile terminal of the passenger which comprises a communication interface.

In this first-mentioned method according to the invention, the personal mobile terminal of the passenger is used in order to carry out the amusement-ride-specific computer program which generates the virtual reality. Therefore, it is no longer necessary that the amusement ride provides hardware for each passenger, by means of which the passenger's own, that is to say passenger-specific, virtual reality is generated for each passenger in accordance with the position and orientation of the head-mounted display of said passenger. Thus, the investment for such hardware is eliminated for the operator of the amusement ride, and this results, in particular, in a reduction of the maintenance and repair expenditure.

As mobile terminals of the passenger, mobile radio units, mobile telephones, in particular, smartphones, tablet computers or laptops can be used, by means of which the amusement-ride-specific computer program can be carried out. Such mobile terminals of the passenger can be kept in the pockets of the passengers' clothes during the journey, in particular the roller coaster journey, and are thus protected from continuous vibration in contrast to hardware that is firmly mounted in the vehicles of the amusement ride. However, the mobile terminals can also sit in the housing of a head-mounted display where they can also be used as integrated representation device, depending on the model. The mobile terminal can also be firmly integrated in the head-mounted display.

An additional advantage results from the fact that the passengers can use their own head-mounted display or virtual reality headset along with their mobile terminal.

Thus, it would also no longer be necessary that such a head-mounted display would have to be provided on each passenger seat. Since such head-mounted displays or virtual reality headsets can be obtained as commercial accessories for mobile telephones such as smartphones or tablet computers and laptops, an amusement ride, in particular a roller coaster, could also be operated without the provision of such head-mounted displays.

As a result of the use of personal mobile terminals and possibly personal head-mounted displays of the passengers, it is moreover not necessary to equip the amusement ride with new equipment in the case in which technical progress is made with regard to the achievable quality of the virtual environment as well as the representation in the head-mounted displays.

According to an advantageous embodiment of the invention, according to the first-mentioned means of attaining the object of the invention, the position of the vehicle on the route is acquired by a position acquisition device with a vehicle communication interface of the vehicle and transmitted to the mobile terminal via the communication interface thereof. This transmission of the position data can occur by wireless link or by means of a cable plug connection, wherein this communication interface of the mobile terminal is designed accordingly. For data transmission by wireless link, the communication interface can be designed to be Bluetooth-enabled or WLAN-enabled.

The position acquisition device of the amusement ride comprises sensors for optical, inductive or mechanical detection of the current position of the vehicle on the route. Based on these sensor data as well as the information on the constitution of the route of the amusement ride provided by the amusement-ride-specific computer program, the position of a vehicle of the amusement ride is determined.

According to an additional embodiment of the invention, it is particularly advantageous according to the first-mentioned means of attaining the object of the invention, if, in order to generate a virtual reality corresponding to the journey with the vehicle by means of the amusement-ride-specific computer program, said computer program is transmitted via a data processing device of the amusement ride to the communication interface of the mobile terminal of the passenger. It is also possible that the computer program is provided by the operator of the amusement ride via an App store server on the Internet for transmission.

Thus, this amusement-ride-specific computer program also contains the information that specifically concerns this amusement ride, especially route data, in order to represent the virtual reality of the journey of the amusement ride synchronized with regard to the direction of travel and the inclination of the vehicle on the head-mounted display. In particular, the lived experience in the virtual reality can be orchestrated with adaptation to the forces and to the vehicle movements felt by the passenger. As a result, the journey can always be experienced in a new manner due to multiple virtual environments. These different versions of the virtual reality of the journey of the amusement ride, for example, a roller coaster, can be implemented with different amusement-ride-specific computer programs, which can be transmitted via the data processing device of the amusement ride to the communication interface of the mobile terminal of the passenger or provided via an App store server on the Internet for transmission.

The second-mentioned means of attaining the object of the invention is characterized according to the invention in that the amusement-ride-specific computer program is executed on an apparatus which is firmly connected to the vehicle, wherein the apparatus is designed with connection means for the connection of the head-mounted display of the passenger.

In this second-mentioned means of attaining the object of the invention, the apparatus, for example a data processing system for executing the amusement-ride-specific computer program, is firmly integrated in the vehicle and has at its disposition standardized commercial connection options to which the passengers can connect their individual head-mounted display via a data connection. In this manner, the operator of the amusement ride receives direct control over the software that can be used, without losing the advantages of using hardware brought along by the passengers, with regard to maintenance and hygiene. In addition, the passengers do not need to have their own mobile terminal, instead they only need a commercial head-mounted display, which, for example, can also be purchased directly at the amusement ride. Thus, the apparatus is integrated in the vehicle and permanently connected with the position acquisition device.

Alternatively to the position acquisition device arranged in the vehicle, it is also possible, in a development, that the position and the dynamic status of the vehicle on the route are acquired by a position and status acquisition device of the mobile terminal of the passenger. This feature is available, since mobile terminals equipped with a navigation function and with inertial sensors, such as, for example, smartphones or tablet computers, are already on the market, so that a position determination of the vehicle relative to the route of the amusement ride is possible, for example, based on a gyroscope and inclinometer incorporated in such a mobile terminal. Such a position and status acquisition device of the mobile terminal comprises sensors, namely rotation sensors, inclinometers or acceleration sensors, gyroscopes or magnetometers as well as a position determination system.

According to a preferred embodiment of the invention, for the generation of the virtual reality of the journey, in accordance with the position and/or the orientation of the head-mounted display, said display is implemented with movement and rotation sensors such as inclinometers or acceleration sensors, gyroscopes and magnetometers. By means of the generated sensor data, using the amusement-ride-specific computer program, the position and the viewing direction of the passenger in the virtual space are calculated and graphically represented accordingly in the head-mounted display.

A communication interface of the mobile terminal of the passenger is designed, in a development, to be WLAN-enabled or Bluetooth-enabled.

Moreover, it is provided, in a development, that the data connection of the communication interface of the mobile terminal of the passenger to the communication interface of the vehicle is implemented by cable connection.

According to a particularly advantageous embodiment of the invention, the vehicle is designed with input devices for operation by the passenger, wherein the actuation of the input device is transmitted via the communication interface to the mobile terminal. Thus, not only are data transmitted to the mobile terminal of the passenger, but the operating data of the input device are also transmitted by said terminal to the amusement-ride-specific computer program. In this way, for example, the actuation of buttons, levers or joysticks of the input device, which are attached, for example, to handholds of the passenger seat, is transmitted to the amusement-ride-specific computer program. Subsequently, in the virtual reality, in accordance with the operating data, a certain action is triggered, i.e., the passenger can influence the run of the computer program.

Preferably, in this design of the vehicle with an input device, the vehicle can be designed with force-feedback devices for the vibration and for the mechanical movement, the activation of which devices is triggered and controlled by the amusement-ride-specific computer program on the mobile terminal by means of the communication interface thereof. By means of a controlled movement of the handholds, for example, the perceivable recoil movement of a virtual on-board gun could be generated, or the passenger seat could be made to vibrate in the case of a virtual explosion.

An additional advantageous embodiment of the invention provides that, in addition to the position of the vehicle on the route, additional data concerning the status of a train consisting of several coupled vehicles or of other vehicles of the amusement ride, are transmitted, in particular via the actuation of input devices of the other vehicles, to the mobile terminal via the communication interface thereof.

According to an additional embodiment of the invention, the data transmitted by the vehicle communication interface are transmitted to mobile terminals of other passengers in other vehicles of the amusement ride. Thus, multiple mobile terminals in multiple vehicles can communicate with a single communication interface of the vehicle.

Finally, in a development, it is also possible that the position and the dynamic status of the vehicle on the route of the amusement ride are transmitted not by a position acquisition device of the vehicle, but rather by a communication interface of the data processing system of the amusement ride to the mobile terminals of the passenger.

Below, the invention is described in detail based on embodiment examples in reference to the appended figures.

FIG. 1 shows a Hock diagram of an amusement ride, namely of a roller coaster, as an explanation of the method according to the invention, and FIG. 2 shows a perspective representation of a vehicle with a passenger of an amusement ride according to FIG. 1.

FIG. 1 shows, in a highly diagrammatic representation, as amusement ride, a roller coaster system 1 on which the individual vehicles or multiple vehicles 2 connected to form trains travel on a rail system as route. FIG. 2 shows the construction of such a vehicle 2 with a passenger 30, which is guided on a route with two rails, in a diagrammatic representation.

The passenger 30 in the vehicle 2 has a personal mobile terminal 10 in the form of a mobile telephone, for example, a smartphone, or in the form of a tablet computer or laptop with a Bluetooth-enabled or WLAN-enabled communication interface 10.1 by means of which an amusement-ride-specific computer program is transmitted by a data processing device 1.1 of the roller coaster 1 and loaded on a data processing system 10.2 of the mobile terminal 10 for execution. The computer program can also be transmitted by an App store server on the Internet.

This amusement-ride-specific computer program is used to generate a virtual reality of a journey with the roller coaster 1, which is represented by means of a head-mounted display 20 of the passenger 30. With such a virtual reality, the illusion is generated for the passenger 30 of realistically experiencing a roller coaster ride in an environment that is specifically adapted to the roller coaster 1. Here, this environment generated as virtual reality can correspond to the actual environment of the roller coaster 1, which can also be enhanced with augmented reality effects, or which can be designed completely as an artificial environment.

The head-mounted display 20, like the mobile terminal 10, represents personal hardware of the passenger 30.

The generation of the virtual reality by means of the amusement-ride-specific computer program and the representation thereof in the head-mounted display 20 are synchronized with the start of the vehicle 2 of the roller coaster 1. In order to determine the position and the viewing direction of the passenger in the virtual space, the head-mounted display 20 is designed with movement and rotation sensors 20.1, the sensor signals of which are transmitted via a data connection DV1 of the data processing device 10.2 of the mobile terminal 10, which generates therefrom the passenger-specific virtual reality of the roller coaster journey and transmits it back to the head-mounted display 20 for representation.

Depending on the model of the head-mounted display 20, the mobile terminal 10 can also sit in the head-mounted display 20 and represent the generated passenger-specific virtual reality there directly, without the representation having to be transmitted first to the head-mounted display 20.

It is also possible to use movement and rotation sensors integrated in the mobile terminal 10, in order to generate a representation of the passenger-specific virtual reality which is specific to the passenger.

In the same way, the mobile terminal 10 can be firmly integrated in the head-mounted display 20.

For the synchronization of the virtual reality with the movement of the vehicle 2 on the rail system of the roller coaster 1, the position thereof, that is to say the location thereof on the rail system, needs to be known. For this purpose, the vehicle 2 comprises a position acquisition device 2.1 which determines the current position of the vehicle 2 on the rail system of the roller coaster 1 on an optical, inductive or mechanical basis. The sensor data of this position acquisition device 2.1 are transmitted via a communication interface 2.2 of the vehicle 2 to the communication interface 10.1 of the mobile terminal 10. By means of these position data, the vehicle-specific and passenger-specific virtual reality is generated by the amusement-ride-specific computer program on the basis of the knowledge of the course of the rail system of the roller coaster 1.

The data connection DV2 between the communication interface 2.2 and 10.1 can be implemented by a wireless link or by means of a cable plug connection for the transmission of the position data of the vehicle 2. A data connection DV2 by wireless link can be implemented by means of a Bluetooth connection or a WEAN connection.

The respective position data of the vehicle 2 on the rail system of the roller coaster 1 during the roller coaster journey can also be made available directly by the mobile terminal 10 of the passenger 30, when said terminal is equipped with a position and status acquisition device 10.3. Such a position and status acquisition device 10.3 for the determination of the position and of the dynamic status of the vehicle 2 comprises, as sensors, an inclinometer or acceleration sensor, a gyroscope, or a magnetometer and a global position determination system. Based on the corresponding sensor signals and the knowledge of the computer program regarding the nature of the route of the roller coaster 1, the position of the vehicle 2 on the rail system is determined.

According to FIG. 2, the vehicle 2 can also comprise an input device 2.3 with buttons, levers or joysticks, which can be arranged, for example, on handholds of the passenger seat, and operated by the passenger 30. The operating data of this input device 2.3 are supplied by means of the data connection DV2 via the interface 10.1 to the data processing system 10.2 of the mobile terminal 10 of the passenger 30 to the amusement-ride-specific computer program, and as a result a certain action is triggered in the virtual reality. In this way, the passenger 30 can influence the course of the amusement-ride-specific computer program or interact with the amusement-ride-specific computer program.

Certain actions triggered by the passenger 30 on the basis of the operation by said passenger of the input device 2.3 dramaturgical elements provided in the amusement-ride-specific computer program can lead to an activation of a force-feedback device 2.4 of the vehicle 2. For this purpose, the data processing system 10.2 of the mobile terminal 10 transmits corresponding control signals via the data connection DV2, for the control of the force-feedback device 2.4, to the communication interface 2.2. Thus, by a controlled movement of the handholds by the passenger 30, for example the perceptible recoil movement of a virtual on-board gun can be generated or the passenger seat can be made to vibrate in the case of a virtual explosion. An additional predetermined action could also consist in that the rotation of a rotatable vehicle 2 is influenced by the amusement-ride-specific computer program.

The possibility of controlling such force-feedback devices 2.4 on handholds or on the passenger seat by means of the amusement-ride-specific computer program opens up an entirely software technology-based, and consequently exceedingly simple to use and flexible, enhancement for dramaturgy and immersion.

The transmission of the actuation of buttons or joysticks to the amusement-ride-specific computer program also opens up tremendous possibilities for interactive enhancement of the experience of a ride, which are nevertheless based entirely on software technology and thus very easy to implement, in particular in connection with the force-feedback device 2.4.

The amusement-ride-specific computer program of the roller coaster 1 is transmitted via a communication interface 1.2 of a data processing device 1.1 of the roller coaster 1 via a data connection DV3 to the mobile terminal 10 via the communication interface 10.1 thereof. This can be implemented via a Bluetooth connection or via a WLAN connection. Furthermore, it is also possible to enable such a transmission of the amusement-ride-specific computer program via an App store server on the Internet instead of a local server as data processing device 1.1.

The amusement-ride-specific computer program of the roller coaster 1 can be made available in different versions to the passenger 30 and downloaded by said passenger via the data connection DV3 to the mobile terminal 10 of said passenger. The data connection DV3 can also be implemented as Internet connection to a server of the operator of the roller coaster 1, so that, via said data connection, different versions and the updates of the amusement-ride-specific computer program can be downloaded to the mobile terminal 10 of the user 30. This can also be implemented via an App store server on the internet.

If a passenger 30 is in possession of a smartphone or tablet PC as mobile terminal 10 as well as of a head-mounted display 20, the passenger can experience a correspondingly equipped roller coaster 1 not only in the form that can actually be observed but in any number of different, virtually enhanced variants. For this purpose, it is only necessary for the amusement-ride-specific computer program, that is the software, to be installed or updated by means of a data connection DV3 or of an Internet connection on the smartphone 10 or tablet PC 10.

The catalog of downloadable virtual new interpretations of a roller coaster 1, implemented in a respective new computer program, can here be constantly enlarged; and, with each "update," it always ensures new interest on the part of the passengers in experiencing the corresponding roller coaster 1 in a new way with a new dramatization.

Since a commercial "smartphone" or a portable tablet PC as mobile terminal 10 is already entirely sufficient order to execute the corresponding software, that is to say the amusement-ride-specific computer program, during the journey, it is also no longer necessary to mount a separate data processing system for each passenger seat of the vehicle 2 of the roller coaster 1 or to accommodate it in a computation center. This results in a considerable savings in procurement costs as well as in maintenance and repair expenditures.

In the case of such a roller coaster 1, it is also no longer necessary to attach a separate head-mounted display 20 to each passenger seat of a vehicle 2 and to maintain and repair it, since these apparatuses are also available as commercial accessories for smartphones, tablet PCs or laptops and can be taken along by the passengers.

The data-processing mobile terminals 10 (smartphones, tablet PCs) can here be kept in the pockets of the clothes of the passengers during the journey and are therefore protected against continuous vibrations, in contrast to hardware that is firmly mounted in the cars.

In addition, during the tracking of the head movement of the passenger 30, this does not result in latency as occurs, for example, with computers set up apart from the track for protection against vibrations, since here the head-mounted display 20 can remain connected directly to the personal smartphone or tablet PC as mobile terminal 10 of the passenger 30. Only the position of the vehicle 2 in the three-dimensional space needs to be transmitted by the roller coaster 1 to the individual hardware of the passenger 30, which, however, even if latencies occur, has no influence on the continuously precisely tracked viewing direction of the head-mounted display 20 and thus on the immersion of the passenger.

Moreover, no passenger 30 is forced to wear a head-mounted display 20 that has already been worn on the same day by thousands of passengers, since each passenger 30 who experiences the virtually enhanced journey uses his/her own personal apparatus.

Due to the use of the personal mobile hardware of the passengers, there is also no need to provide new equipment for the entire system, in the case of technical progress with regard to the achievable quality of the virtual environment and the representation in the head-mounted displays.

Instead, an amusement-ride-specific computer program adapted individually to each commercial mobile operating system and to each mobile hardware, and a communication interface with the roller coaster 1 allow an individually adapted experience which, in each case, can make optimal use of the available resources of the hardware of the passenger 30.

An additional advantage consists in that existing roller coasters can also be retrofitted at very low cost for carrying out the method according to the invention, since only a system for the detection of the train position on the track, and a device for the connection to the smartphone or tablet PCs as mobile terminals 10 of the passengers need to be installed, for example, by means of a Bluetooth connection or of a WLAN connection.

In the embodiment example according to FIGS. 1 and 2, the amusement-ride-specific computer program is executed on a mobile terminal 10 of the passenger 30.

Alternatively, in an additional embodiment example, it is possible to have the amusement-ride-specific computer program be run on an apparatus firmly installed on the vehicle 2, for example a data processing system, so that the passenger 30 only needs to bring along his/her own head-mounted display. This apparatus for running the specific computer program is firmly connected to the position acquisition device 2.1 of the vehicle 2 and it comprises commercial connection options to which the passenger 30 can connect his/her individual head-mounted display 20 via a data connection DV1. In this way, the operator of the amusement ride 1 gets direct control over the software that can be used, without losing the advantages of the use of hardware brought along by the passengers, with regard to maintenance and hygiene. In addition, the passenger 30 does not need to have his/her own mobile terminal, but only a commercial head-mounted display 20, which can also be purchased directly, for example, at the amusement ride.

An additional variant of the invention provides for use in transport means such as, for example, cars, trains or airplanes.

It is known to enhance vehicles, particularly passenger cars, but also trains/rail vehicles or airplanes, with a data processing system for the representation of virtual realities or for the playback of spherical VR videos as well as with a VR headset, so that persons riding along can find themselves in a different environment, possibly a more entertaining environment than the road actually traveled.

For this purpose, the respective vehicle needs to be equipped with a data processing system for representing the virtual realities, which entails a considerable financial expense with regard to procurement as well as maintenance and repair of the system.

In addition, the VR software installed in this data processing system, and the apparatus drivers thereof is always limited the selection of the usable VR headsets to the VR headsets known at the time of the installation. If new headsets are to be supported, a software update needs to be carried out.

The respective graphics performance of the hardware of the data processing system in question also limits the selection of the usable headsets. If a new headset with higher image resolution, for example, comes on the market, then, in order to provide support for this apparatus, under some circumstances, the entire system needs to be replaced with hardware with better graphics performance.

In addition, the data processing system connected to the vehicle limits the available VR contents to the respective software installed. It is not possible for the user to run individual VR applications or VR applications brought along (which can be available on the Internet, for example), to the extent that they have not been made available beforehand on the firmly installed data processing system.

In addition, there is the problem that, in the case of firmly installed VR headsets or VR headsets taken long in the glove box, different passengers always have to wear a headset that has already been worn beforehand, possibly by unknown individuals, with direct skin contact. This entails a considerable expense with regard to cleaning and disinfection.

If, instead, one equips the speed or status measurement unit which, as a rule, is already integrated in a motor vehicle, with a data processing system and an interface (for example, a Bluetooth transmitter) for the connection to mobile VR apparatuses, then, via this connection, continuous statuses of the vehicle (for example, GPS position, orientation of the vehicle, speed of the vehicle) can be transmitted to an application ("VR App"), which is run on a personal mobile VR apparatus of the person riding along.

These data can be used in the VR App for the corresponding synchronized journey through a virtual landscape as well as for the synchronous representation of the orientation of the virtual vehicle in the simulated reality.

Since, as a result, only status data need are transmitted, data processing systems for the representation of virtual realities no longer need to be integrated in the corresponding vehicles. As a result, the procurement costs for a data processing system with high graphics performance as well as for the maintenance and repair thereof are eliminated.

In addition, by means of this system, the correspondingly equipped vehicle is no longer limited to a few headset models; instead, the system can be used with any mobile VR apparatus. The contents and the representation quality thus are not dependent on hardware mounted on the vehicle or on any driver updates that may be required.

The respective VR Apps can be obtained, for example, via Internet. These Apps are optimized in each case individually to the respective VR apparatus and they can be freely enhanced with different VR applications by downloading. Moreover, the user also can select his/her individual VR App freely and is not limited to the Apps that were installed beforehand on any firmly mounted data processing system.

In this way, each user can take along his/her own personal VR apparatus and use it in any correspondingly equipped vehicle. As a result, it is possible to use one's own private headset and one is not forced to use a headset that has already come in contact with many other users beforehand and that may possibly not have been cleaned or disinfected completely.

An additional variant of the invention provides for use with fitness apparatuses.

It is known to enhance fitness apparatuses (such as, for example, treadmills, ergometers or steppers) with a data processing system (for the representation of virtual realities or for the playback of spherical VR videos) and with a VR headset, so that the training individual finds himself/herself in another, possibly motivating environment.

For this purpose, the respective fitness apparatus must be equipped with a data processing system for the representation of the virtual realities, which entails a significant financial expenditure with regard to procurement as well as maintenance and repair of the system.

In addition, the VR software installed on this data processing system and the apparatus drivers thereof is always limited the selection of the usable VR headsets to the VR headsets known at the time of the installation. If new headsets are to be supported, a software update has to be carried out.

The respective graphics performance of the hardware of the data processing system in question also limits the selection of the headsets that can be used. If a new headset with higher image resolution, for example, comes on the market, the entire system has to be replaced under some circumstances with hardware with better graphics performance.

In addition, the data processing system connected to the fitness apparatus limits the available VR contents to the respective software installed. It is not possible for the user to run individual VR applications or VR applications brought along (which can be available on the Internet, for example), if they are not made available by the operator on the firmly installed data processing system.

In addition, there is the problem that the VR headset absorbs much perspiration due to the physical activity of the user. As a result, it is exceedingly difficult to operate the respective headset hygienically, particularly if it is used by hundreds of visitors in fitness studios. Even in the case of a permanent exchange of the headset, the headset must always be expensively cleaned and disinfected, which not only entails a high cost for larger fitness studios but which, moreover, can also negatively affect the useful life of the housing material.

If, instead, one equips the speed or status measurement unit, which as a rule is already integrated in such a fitness apparatus with a data processing system and an interface (for example, a Bluetooth transmitter) for the connection to mobile VR apparatuses, then continuous statuses of the fitness apparatuses (for example, the speed of a treadmill, the speed of rotation of an ergometer wheel, the position of the steps of a stepper, or the position of paddles and seat element of rowing equipment) can be transmitted via this connection to an application ("VR App"), which is run on a personal mobile VR apparatus of the training individual.

These data can be used in the VR App for the corresponding synchronized movement through a landscape as well as for the synchronous representation of a virtual body of the training individual.

Since only status data are transmitted here, as a rule data processing systems no longer need to be integrated in the corresponding fitness apparatus for the representation of virtual realities. As a result, procurement costs for a data processing system with high graphics performance well as for the maintenance and repair thereof are eliminated.

By means of this system, the correspondingly equipped fitness apparatus is no longer limited to a few headset models, but can be used instead with any mobile VR apparatus. The contents and the representation quality are thus no longer dependent on hardware mounted on the fitness apparatus or any driver updates that may be needed. The respective VR Apps can be obtained, for example, via the Internet. As a result, they are in each case optimized individually to the respective VR apparatus and can be freely enhanced with other VR applications by downloading. In addition, the user can freely select his/her individual VR App and is not limited to the Apps that were installed beforehand on any firmly mounted data processing system by the fitness studio operator.

In this way, each user can bring along his/her own personal VR apparatus and use it in any correspondingly equipped fitness apparatus. As a result, the training individual can use his/her own private headset and is not forced to use a headset that has already come in contact with the perspiration of many other users or that may possibly not have been completely cleaned and disinfected.

In an advantageous embodiment of the invention, the respective fitness apparatus can also be controlled by means of the existing communication site by operation of the mobile VR apparatus. Mobile VR headsets, due to the hardware contained therein, have input devices that can be actuated by the user, in order to control certain functions such as, for example, the predetermined speed of a treadmill. The respective VR App can also control the fitness apparatus in an automated way, for example, by adaptation of the ergometer resistance depending on the slope or gradient in the virtual route arrangement.

LIST OF REFERENCE NUMERALS

1 Amusement ride, roller coaster
1.1 Data processing device of the amusement ride
1.2 Communication interface of the data processing device 1.1
2 Vehicle of the amusement ride 1
2.1 Position acquisition device of the vehicle 2
2.2 Communication interface of the vehicle 2
2.3 Input device of the vehicle 2 for operation by the passenger 30
2.4 Force feedback devices of the vehicle 2
10 Mobile terminal of a passenger of the amusement ride 1
10.1 Communication interface of the mobile terminal 10
10.2 Data processing system of the mobile terminal 10
10.3 Position and status acquisition device of the mobile terminal 10
20 Head-mounted display of a passenger of the vehicle company 1
20.1 Movement and rotation sensors of the head-mounted display 20
30 Passenger
DV1 Data connection between mobile terminal 10 and head-mounted display 20
DV2 Data connection between the communication interface 10.1 and the communication interface 2.2
DV3 Data connection between the communication interface 1.3 and the communication interface 10.1

The invention claimed is:

1. A method for operating an amusement ride (1), in particular a roller coaster, with at least one vehicle (2) which moves along a route and accommodates at least one passenger (30),
wherein,
providing, by means of an amusement-ride-specific computer program, a virtual reality corresponding to a journey of the vehicle (2) is generated by means of an amusement-ride-specific computer program and represented on a head-mounted display (20) associated with the passenger (30) of a vehicle (2) in accordance with the position of the vehicle (2) on the route as well as in accordance with the position and/or the orientation of the head-mounted display (20), characterized in that the amusement-ride-specific computer program is executed on a mobile terminal (10) of the passenger (30) which comprises a communication interface (10.1).

2. The method according to claim 1, characterized in that the position of the vehicle (2) on the route is acquired by a position acquisition device (2.1) with a vehicle communication interface (2.2) of the vehicle (2) and is transmitted to the mobile terminal (10) via the communication interface (10.1) thereof.

3. The method according to claim 2, characterized in that a data connection (DV2) of the communication interface (10.1) of the mobile terminal (10) of the passenger is implemented to be connected by cable to the communication interface (2.2) of the vehicle (2).

4. The method according to claim 2, characterized in that the data transmitted by the vehicle communication interface (2.2) are transmitted to mobile terminals of additional passengers in other vehicles of the amusement ride (1).

5. The method according to claim 1, characterized in that, by means of the amusement-ride-specific computer program, said computer program is transmitted to the communication interface (10.1) of the mobile terminal (10) of the passenger (30) via a data processing device (1.1) of the amusement ride (1), for the generation of a virtual reality corresponding to the journey with the vehicle (2).

6. The method according to claim 1, characterized in that the position of the vehicle (2) on the route is acquired by a position acquisition device (2.1) with a vehicle communication interface (2.2) of the vehicle (2) and is transmitted to the mobile terminal (10) via the communication interface (10.1) thereof, and the position acquisition device (2.1) is connected to the apparatus.

7. The method according to claim 1, characterized in that the position and the dynamic status of the vehicle (2) on the route are acquired by a position and status acquisition device (10.3) of the mobile terminal (10) of the passenger.

8. The method according to claim 1, characterized in that, for the generation of the virtual reality of the journey in accordance with the position and/or orientation of the head-mounted display (20), said display is designed with movement and rotation sensors (20.1).

9. The method according to claim 1, characterized in that, as the mobile terminal (10) of the passenger, a mobile radio unit, a mobile telephone, in particular a smartphone or a tablet computer or a laptop computer is used, wherein the mobile terminal (10) is designed for executing the amusement-ride-specific computer program.

10. The method according to claim 1, characterized in that the communication interface (10.1) of the mobile terminal (10) of the passenger is designed to be WLAN-enabled or Bluetooth-enabled.

11. The method according to claim 1, characterized in that the vehicle (2) is designed with input devices (2.3) for operation by the passenger (30), wherein the actuation of the input device (2.3) is transmitted via the communication interface (10.1) to the mobile terminal (10).

12. The method according to claim 1, characterized in that the vehicle (2) is designed with force feedback devices (2.4) for the vibration or for the mechanical movement, the activation of which is triggered and controlled by the amusement-ride-specific computer program on the mobile terminal (10) by means of the communication interface (10.1) thereof.

13. The method according to claim 1, characterized in that, in addition to the position of the vehicle (2) on the route, additional data on the status of a train consisting of several coupled vehicles, or of other vehicles of the amusement ride (1), in particular on the actuation of input devices (2.3) of the other vehicles, is transmitted to the mobile terminal (10) via the communication interface (10.1) thereof.

14. The method according to claim 1, characterized in that the position and dynamic status of the vehicle (2) on the route of the amusement ride (1) is transmitted by a communication interface (1.2) of a data processing device (1.1) of the amusement ride (1) to the mobile terminals (10) in the motor vehicle.

15. A device that creates a virtual reality (VR) for a user, with the following features:

a mobile VR apparatus for a user with a data interface the VR apparatus is coupled via the interface to a device which itself moves or is set at least partially in motion by the user, means for transmitting a parameter for the movement of the device to the interface of the mobile VR apparatus, means in the mobile VR apparatus for linking the parameter to the virtual reality that is provided to the user by the mobile VR apparatus, wherein, by means of an amusement-ride-specific computer program, the VR apparatus corresponding to a journey of an amusement ride vehicle (2) is generated by means of an amusement-ride-specific computer program and represented on a head-mounted display (20) associated with the user as a passenger (30) of the vehicle (2), in accordance with the position of the amusement ride vehicle (2) on the route as well as in accordance with the position and/or the orientation of the head-mounted display (20), characterized in that the amusement-ride-specific computer program is executed on the mobile VR apparatus, which comprises a communication interface (10.1).

* * * * *